United States Patent
Chao et al.

(10) Patent No.: US 9,251,491 B2
(45) Date of Patent: Feb. 2, 2016

(54) PERFORMANCE-AWARE ENTERPRISE COMPONENTS

(75) Inventors: Tian Jy Chao, Bedford, NY (US); Pankaj Dhoolia, Uttar Pradesh (IN); Fenno F. Heath, III, Woodbridge, CT (US); Santhosh Kumaran, Peekskill, NY (US); Shao Chun Li, Beijing (CN); Florian Pinel, New York, NY (US); Sreeram Ramakrishnan, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 943 days.

(21) Appl. No.: 12/627,071

(22) Filed: Nov. 30, 2009

(65) Prior Publication Data

US 2011/0131080 A1 Jun. 2, 2011

(51) Int. Cl.
*G06Q 10/00* (2012.01)
*G06Q 10/06* (2012.01)
*G06F 11/34* (2006.01)
*G06Q 10/10* (2012.01)

(52) U.S. Cl.
CPC ............ *G06Q 10/0639* (2013.01); *G06Q 10/06* (2013.01); *G06F 11/3409* (2013.01); *G06F 2201/865* (2013.01); *G06Q 10/10* (2013.01)

(58) Field of Classification Search
CPC .............. G06F 19/3406; G06Q 10/06; G06Q 10/0639; H04W 92/08; H04W 4/001; H04W 8/18; G06K 7/10297
See application file for complete search history.

(56) References Cited

U.S. PATENT DOCUMENTS

| | | |
|---|---|---|
| 5,233,513 A | 8/1993 | Doyle |
| 7,188,169 B2 | 3/2007 | Buus et al. |
| 7,222,302 B2 | 5/2007 | Hauser et al. |
| 7,313,533 B2 | 12/2007 | Chang et al. |
| 2002/0038217 A1 | 3/2002 | Young |
| 2002/0099579 A1 | 7/2002 | Stowell et al. |

(Continued)

OTHER PUBLICATIONS

Mortveit, H.S., and C.M. Reidys. "Discrete, Sequential Dynamical Systems." Discrete Mathematics 226.1-3 (2001): 281-95. Print.*

(Continued)

*Primary Examiner* — William Brockington, III
(74) *Attorney, Agent, or Firm* — Ryan, Mason & Lewis, LLP

(57) ABSTRACT

Techniques for generating and executing a performance-aware enterprise component (PAEC) are provided. The techniques include creating a performance-aware enterprise component definition, wherein an enterprise component is a component with defined behavior and data models that represent an enterprise capability and provide a service to a client through a defined interface, and wherein the definition comprises an extensible markup language file comprising process component lifecycle information, one or more data items to be used in the component lifecycle, and one or more performance metrics, and executing the performance-aware enterprise component, wherein executing the performance-aware enterprise component comprises reading the performance-aware enterprise component definition and one or more relationships with the one or more data items, and operating the component lifecycle, wherein operating the component lifecycle comprises using the one or more performance metrics within the component lifecycle to enable one or more localized changes to be made within the enterprise component.

16 Claims, 11 Drawing Sheets

(56) References Cited

U.S. PATENT DOCUMENTS

| | | | |
|---|---|---|---|
| 2007/0130208 A1* | 6/2007 | Bornhoevd et al. | 707/104.1 |
| 2007/0162903 A1* | 7/2007 | Babb et al. | 717/154 |
| 2008/0234878 A1* | 9/2008 | Joao | 701/2 |
| 2009/0182779 A1* | 7/2009 | Johnson | 707/200 |
| 2009/0319312 A1* | 12/2009 | Moerdler et al. | 705/7 |

OTHER PUBLICATIONS i2. http://www.i2.com/.
SAP. http://www.sap.com/usa/index.epx.
Manugistics. http://www.jda.com/manugistics/.
Viewlocity. http://www.viewlocity.com/.
Oracle. http://www.oracle.com/index.html.
Tibco. http://en.wikipedia.org/wiki/Tibco_Software.
Webmethods. http://en.wikipedia.org/wiki/WebMethods.
Systar. http://www.systar.com/.
Zeng et al. Model-Driven Business Performance Management. Proceedings of the 2005 IEEE International Conference on e-Business Engineering.
Jones et al. A Multi-level/Multi-layer Architecture for Intelligent Shopfloor Control, International Journal of Computer Integrated Manufacturing, vol. 3, No. 1, 1990, pp. 60-70.
Barrett et al. On Some Special Classes of Sequential Dynamical Systems. 2003.

* cited by examiner

FIG. 7

INFORMATION MODEL: 702

| ATTRIBUTE | DATA TYPE | UNIQUE | CARDINALITY | InSUMMARY |
|---|---|---|---|---|
| NAME | STRING | N | 1 | Y |
| DESCRIPTION | STRING | N | 1 | Y |
| ComponentId | LONG | N | 1 | N |
| ComponentName | STRING | N | 1 | N |
| LastCalculatedTime | dateTime | N | 1 | N |
| ActionExpressions | STRING | N | n | N |
| DependentMetrics | STRING | N | n | N |
| VALUE | LONG | N | 1 | N |
| ValueExpression | STRING | N | 1 | N |
| ValueSlots | STRING | N | n | N |
| DIMENSION | STRING | N | 1 | N |

METRIC LIFECYCLE:
*EDIT LIFECYCLE BY COPY/PASTING STATES/TRANSITIONS*

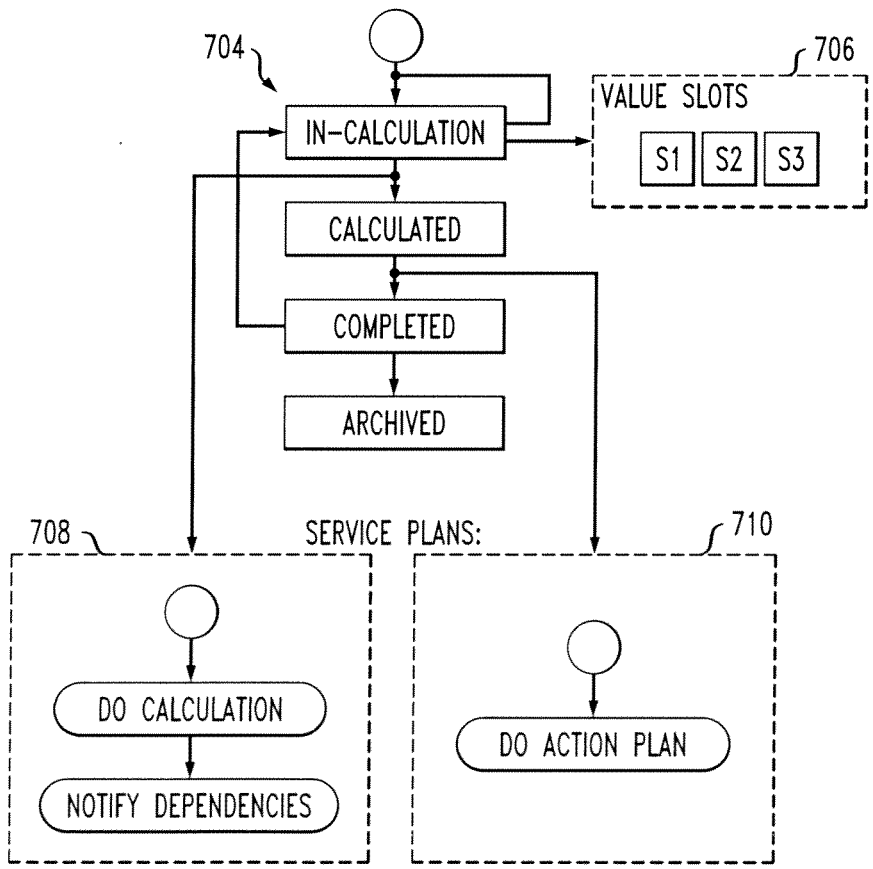

PERFORMANCE-AWARE ENTERPRISE COMPONENTS

FIELD OF THE INVENTION

The present invention relates to enterprise performance management and, more particularly, to performance metrics within components.

BACKGROUND OF THE INVENTION

It is known that in a dynamic on-demand enterprise environment, such as an enterprise environment, enterprise performance management (EPM) is critical to enable a globally integrated enterprise (GIE) model with improved agility. Enterprise performance management facilitates the capture of core enterprise metrics, thereby enabling the detection of control action triggers. Traditionally, enterprise performance management and process automation are treated separately and implemented as individual silos. Such an approach results in a decreased ability of the enterprise to adapt to significant changes in a meaningful timeframe. When realizing EPM architectures, it is important to unambiguously define the data model and process model attributes associated with process automation. It is also critical to clearly define the interfaces between the performance management and process automation components, and the required and enabling artifacts.

While there are some traditional approaches for attempting to improve the communication language between process automation and enterprise performance management, they do not mitigate issues resulting from the segregated approach used in designing, modeling, architecting, and implementing process automation and performance management components. Another issue with traditional approaches is the challenges involved in dynamic addition of new enterprise components, or modifications of existing ones.

SUMMARY OF THE INVENTION

Principles and embodiments of the invention provide performance-aware enterprise components. An exemplary computer-implemented method for generating and executing a performance-aware enterprise component (PAEC), according to one aspect of the invention, can include steps creating a performance-aware enterprise component definition, wherein an enterprise component is a component with defined behavior and data models that represent an enterprise capability and provide a service to a client through a defined interface, and wherein the definition comprises an extensible markup language file comprising process component lifecycle information, one or more data items to be used in the component lifecycle, and one or more performance metrics, and executing the performance-aware enterprise component, wherein executing the performance-aware enterprise component comprises reading the performance-aware enterprise component definition and one or more relationships with the one or more data items, and operating the component lifecycle, wherein operating the component lifecycle comprises using the one or more performance metrics within the component lifecycle to enable one or more localized changes to be made within the enterprise component.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps.

Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 7 is a diagram illustrating an exemplary performance metric template, according to an embodiment of the present invention;

DETAILED DESCRIPTION OF EMBODIMENTS

Figure 1:
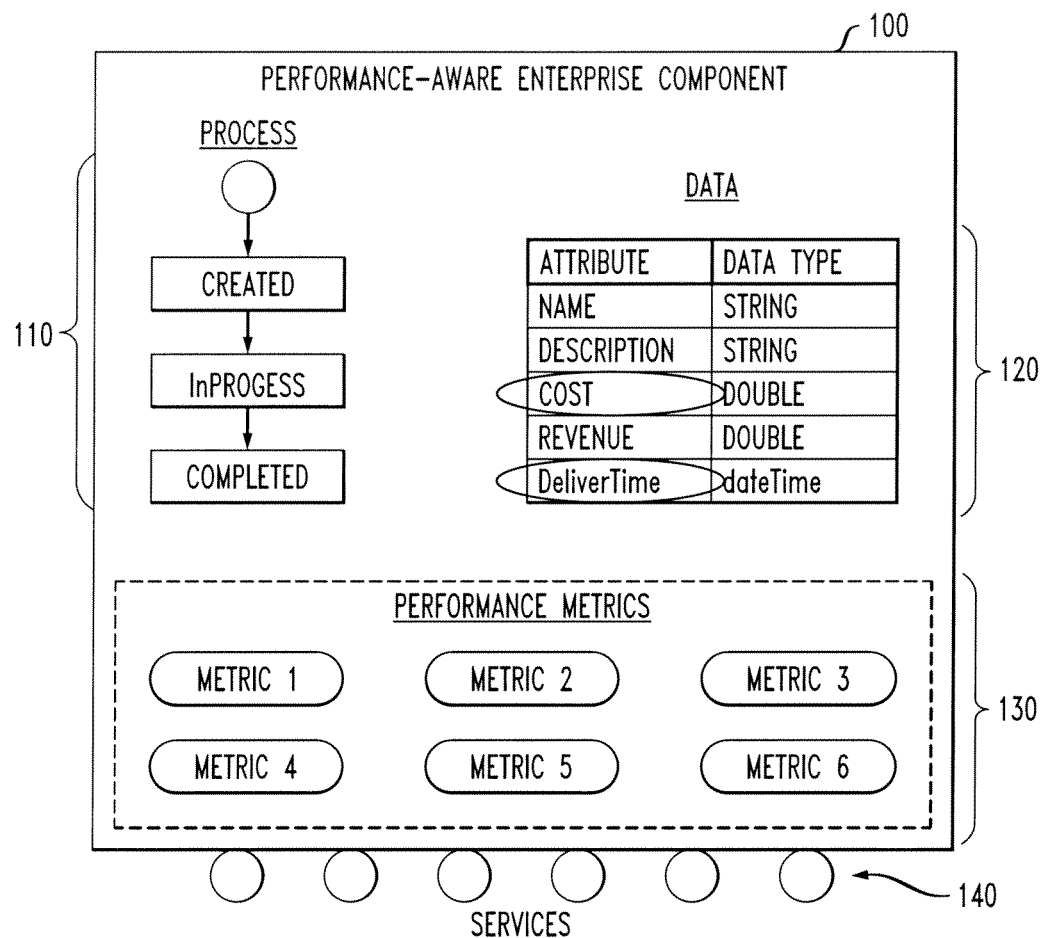
FIG. 1 illustrates a performance-aware enterprise component (PAEC), according to an illustrative embodiment of the invention.

Principles of the invention include performance-aware enterprise components. As used herein, the term "enterprise" is understood to broadly refer to any entity that is created or formed to achieve some purpose, examples of which include, but are not limited to, an undertaking, an endeavor, a venture, a concern, a corporation, an establishment, a firm, an organization, or the like. Thus, "enterprise processes" are processes that the enterprise performs in the course of attempting to achieve that purpose.

As used herein, the phrase "enterprise component" is understood to broadly refer to a reusable component with defined behavior and data models that represent an enterprise capability and provide services to clients through a well-defined interface and can evolve independently.

As detailed herein, one or more embodiments of the invention include providing performance-aware enterprise components that are able to participate in the implementation of a complex enterprise process while managing its own enterprise performance. Also, the techniques described herein include enabling the decomposition of a complex enterprise process management domain into a set of components that are able to collaborate in executing any generic enterprise process and to manage the enterprise performance as well using the same component model.

In one or more embodiments of the invention, performance metrics can be natively embedded within an enterprise component, such that the enterprise component includes enterprise data, lifecycle and performance metrics. By using such an approach, additional probe points and enterprise events are not explicitly needed for metric calculation because metrics are natively within a component context.

The techniques described herein also include defining aggregation types and lifecycles for performance metric, and using a Sequential Dynamic Systems (SDS) model to control a sophisticated performance metric network leading to a formal model of performance management. Additionally, the techniques detailed herein are scalable and evolvable in the sense that new requirements can be accommodated via local changes.

One or more embodiments of the invention provide techniques for generating and executing performance-aware enterprise components (PAEC). Such techniques enable performance metrics within enterprise components, thus making typical enterprise components (with only process and data) to be "performance-aware." In this way, the metrics in a PAEC can easily be aware of all the key performance data within the context of the component (for example, lifecycle, data change, etc.), as well as self-maintain their lifecycle for metric calculation, situation detection and action planning. Those performance data can be retrieved, for example, through service interfaces.

Thus, advantageously, performance-aware enterprise components enable changes (for example, addition, modification, etc.) to be localized within a given enterprise component. This enables the relatively easy addition of more performance-aware components as enterprise changes without necessitating any changes in the EPM (enterprise process management) runtime environment. Furthermore, it also provides scalability, agility, and dynamic composability, as mentioned above.

FIG. 1 illustrates a performance-aware enterprise component (PAEC) 100 according to an illustrative embodiment of the invention. As shown, the schema in FIG. 1 illustrates that PAEC 100 comprises the following elements: process 110, data 120, performance metrics 130 and services 140.

As will be further described below, process 110 describes the lifecycle of component 100. In an illustrative embodiment, the process is represented as a state machine. A process can represent the lifecycle of the component in question, as well as the service invocation between the lifecycle transitions. Data 120 describes the data items to be used in the components lifecycle, as well as to be used for monitoring. Performance metrics 130 (comprised of metrics 1 through 6 in this simple example) are each related to process execution states and data fields. Each performance metric has its own lifecycle description for calculation. Each performance metric also has its service plan for dependencies notification, situation evaluation and action taking. Services 140 are provided in PAEC 100 for metric value retrieving, as well as for use in firing calculation and action planning.

Figure 2:
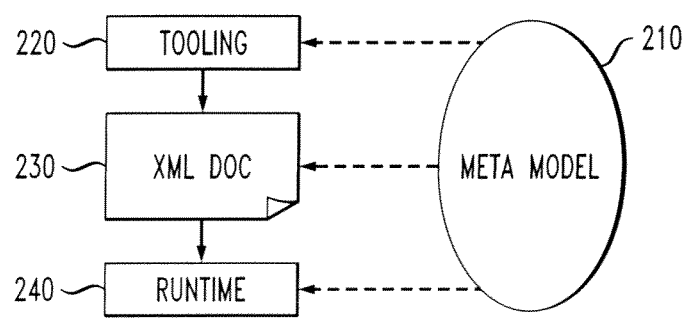
FIG. 2 illustrates a system for generating and executing a performance-aware enterprise component, according to an illustrative embodiment of the invention.

FIG. 2 illustrates a system for generating and executing a performance-aware enterprise component, according to an illustrative embodiment of the invention. As shown, and as will be further described below, a tool component 220 creates PAEC definitions as XML (eXtensible Markup Language) files 230 from a meta model 210. A runtime system 240 executes the created PAEC. The runtime system 240 reads the definition of the PAEC, and the relationship with the runtime data and flow. It forms metrics graphs according to inter-metrics dependencies. The runtime system 240 also helps the PAEC to capture system changes and operate the lifecycle.

Meta model 210 is the core for the representation of a performance-aware enterprise component. The meta model goes through several aspects including tooling (220), XML presentation (230) and runtime (240).

Figure 3:
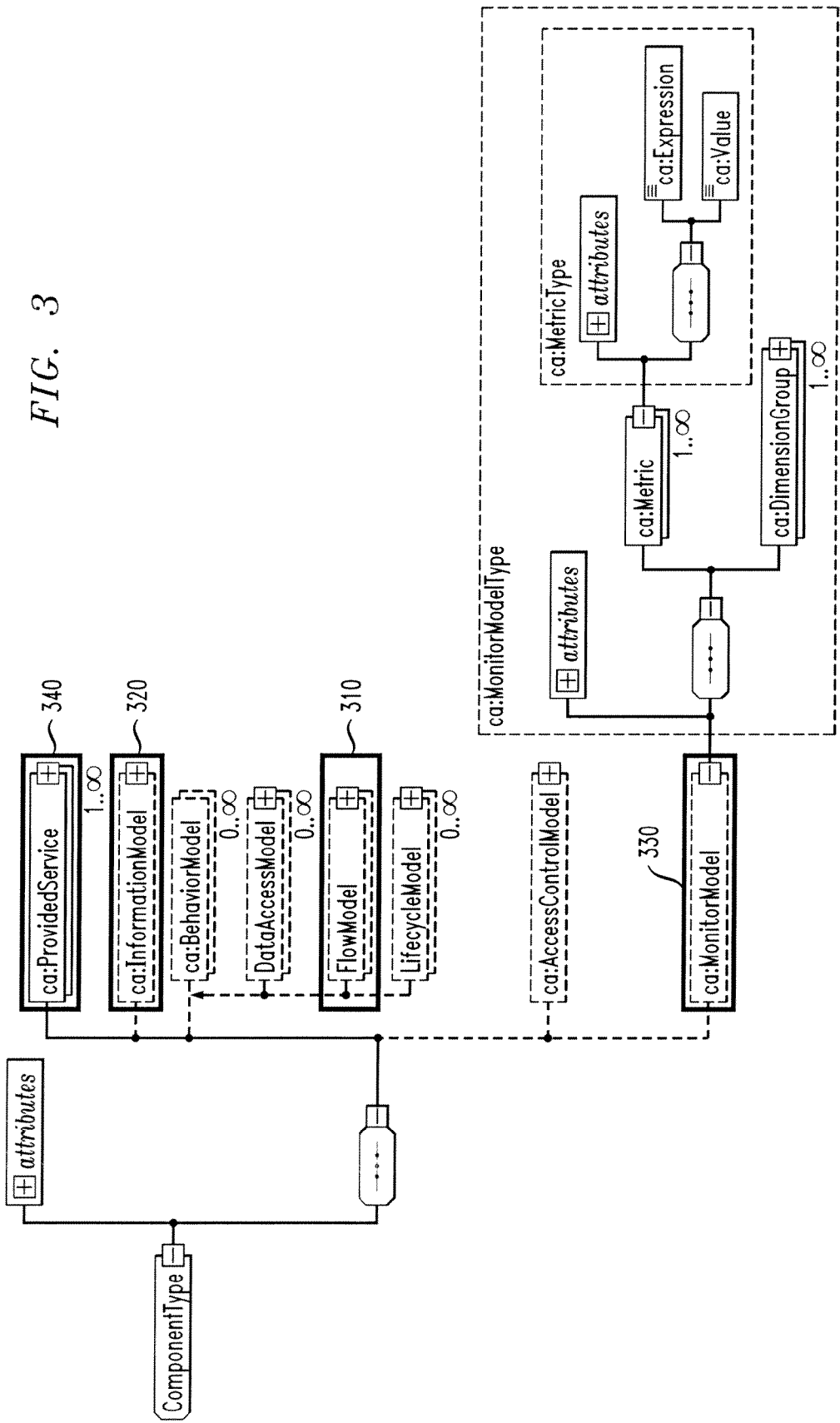
FIG. 3 illustrates a structure of a meta model, according to an illustrative embodiment of the invention.

FIG. 3 illustrates an illustrative embodiment of a structure of a meta model, according to an illustrative embodiment of the invention. As shown, there are four main sub-model elements including "FlowModel" 310, "InformationModel" 320, "MonitorModel" 330 and "ProvidedService" 340, which represent "process," "data," "performance metric(s)" and "service(s)," respectively, as described above in the context of FIG. 1.

It is to be appreciated that since process, data and services are expressed in typical enterprise models (that is, non performance-aware enterprise models), the "FlowModel," "InformationModel," and "ProvidedService" elements can be realized with existing sub-model definitions known to those ordinarily skilled in the art. "FlowModel" 310 and "LifecycleModel" describe a process that represents the lifecycle of this component as well as the service invocation between the lifecycle transitions, which can be represented by a typical state machine. "InformationModel" 320 describes data items be used in the components lifecycle which usually can be represented in XSD data schema. "ProvidedService" 340 includes the required and provided service definition including input/output data schema of the component like the definition in WSDL (Web Service Definition Language). "BehaviorModel" is an abstract model for "FlowModel" 310 and "LifecycleModel" which can be used for abstraction purposes. However, in this illustrative embodiment, it is the "MonitorModel" element that enables the enterprise component generated in accordance with this meta model to be performance-aware. As such, this element is described in detail herein.

One or more embodiments of the invention can include an exemplary instance of "MonitorModel" where the schema definition is at component 330 in FIG. 3. In such an example, there can be eight metrics definition and two dimension definitions. "Instance Level" and "Class Level" are types of metrics which can be used to distinguish measurement scope of the metrics during the monitoring and calculation purpose. "Instance Level Metric" scope is at component instance level (for example, "CleanCupsNumber" for an EnterpriseComponent instance). "Class Level Metric" will be used to measure aggregated components (for example, some aggregated value: COUNT, AVG, SUM, MAX, MIN etc.). "Dimension Definition" describes the category to group "Class Level Metric" (for example, "TotalCups by Owner"), and normally the dimension can be defined by one or more data attributes in information model of the enterprise component.

Recall the tooling (or tool) component 220 in FIG. 2. The tool component is used to model a PAEC 100 and generate an XML document 230 by using a meta model definition. To support a complete PAEC XML definition, tooling component 220 performs process modeling, information modeling, as well as metric modeling. In particular, a performance metric can be defined with certain expressions by using an information model as well as lifecycle transition model. The tooling component can be implemented in one or more existing editing frameworks (for example, PowerPoint (PPT), Eclipse or Web which provides basic editing function (for example, process modeling, information modeling, and metric modeling, etc.)), with UI (user interface) menu/dialogs that allow a user to create the elements of a PAEC XML definition, and to generate an XML representation using a conventional XML file generator (for example, a common text file creator (notepad), or using XML specific java library (for example, JDom and Dom4J)).

Recall the XML document 230 in FIG. 2. This document is the platform-independent model presentation which follows the meta model definition and can be deployed into the runtime system.

Figure 4:
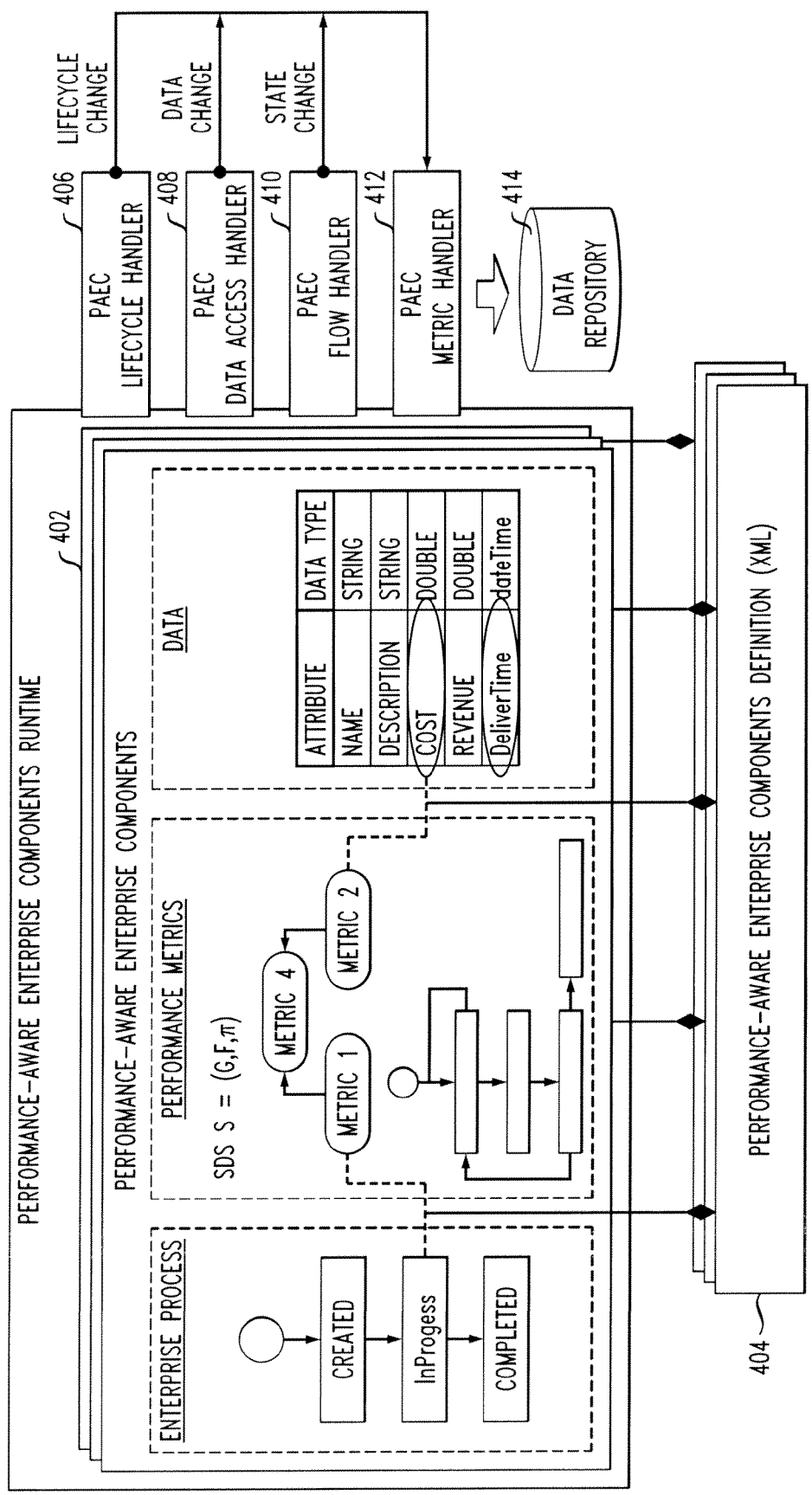
FIG. 4 illustrates performance-aware enterprise runtime components, according to an illustrative embodiment of the invention.

FIG. 4 illustrates performance-aware enterprise runtime components, according to an illustrative embodiment of the invention. By way of illustration, FIG. 4 depicts performance-aware enterprise components 402, which include an enterprise process, performance metrics and data. FIG. 4 also depicts a performance-aware enterprise components definition (XML) component 404, a PAEC lifecycle handler 406 (which sends lifecycle changes to the PAEC metric handler), a PAEC data access handler 408 (which sends data changes to the PAEC metric handler), a PAEC flow handler 410 (which sends state changes to the PAEC metric handler), a PAEC metric handler 412, and a data repository 414, which receives input from the metric handler.

Recall the runtime system 240 in FIG. 2. The runtime component can be implemented under any J2EE container such as "Websphere" or "Tomcat." It loads the XML presentation of PAEC, and serves handling transitions for defined performance aware components. Since the components are performance awareable, those components' transition are all with in the component context, and the runtime retrieves those context information with given metric expression to further support operating the metric instance lifecycle (creating, calculating, actioning, saving).

One or more embodiments of the invention also include metric graph handling. Because performance metrics have inter-dependencies regarding their calculated value, the sequence for their calculation lifecycle should be well arranged to avoid mistakes (for example, confliction, duplication, disordering and deadlock). As such, one or more embodiments of the invention include a sequential dynamical system (SDS) model for forming up the metric graph network.

SDS is a theoretical framework for analyzing discrete models. An exemplary SDS model includes the following three components: an underlying graph $G=(V,E)$, a set of local update functions F, and an update order $\pi$. Each node in V denotes an "element." In one or more embodiments of the invention, one can think of each node as representing a performance metrics. The edges in E denote the dependencies between metrics. Thus, an edge between variables x and y denotes that "x and y are interdependent." Each node (variable) x has an update rule (function) associated with it. The function f associated with x captures how x depends on other variables. The inputs to f are the current values of x and the values of its neighbors (in G). The set of all of these functions forms F. $\pi$ is a permutation on the nodes and it denotes that order in which the nodes are updated at any time step.

One or more embodiments of the invention can also include input/output sequential dynamical systems (IO-SDS) as a natural extension to the standard SDS model. An IO-SDS over domain D is a tuple $S=(G=(V \cup I \cup O,E),F, \pi)$ such that the following hold:

1. V (internal nodes), I (input nodes), and O (output nodes) are mutually disjoint sets such that $\|V\|=nV$, $\|I\|=nI$, and $\|O\|=nO$.
2. $G=(V \cup I \cup O,E)$ is an undirected graph with nI+nV+nO nodes. Let n=nV+nO. The set of nodes in $V \cup O$ are labeled 1, 2, ..., n. G is called the underlying graph of S.
3. E contains no edge from $\{(x,y)|x,y \in I\} \cup \{(x,y)|x,y \in O\}$.
4. $F=(f1, f2, \ldots, fn)$ is an ordered set of Boolean functions such that, for each i=1, 2, ..., n, the following holds: If the degree of node i is k, then fi is a function of type $D^{k+1} \rightarrow D$. For each i=1, 2, ..., n, fi is the called the local transition function for node i.

As additionally described herein, one or more embodiments of the invention include metric graph forming implementations. Graph forming policies can include, for example, dependencies introduction such as the following:

A "{B}+xPath"→A depends on B;
A "{B}+{C}"→A depends on B and C; and
A "xPath"→A depends on nothing, and can be a contributor node.

Forming policies can also include, for example, the following. If there is no relationship between class level metrics and instance level metrics, one or more embodiments of the invention inexplicitly note that those class level metrics depend on those instance level metrics. Additionally, a forming policy can include, for example, that a dimensional class level always depends on all class level metrics completion.

Further, one or more embodiments of the invention can include forming algorisms (with forming policies) as follows:

0. Form dependentMap[ . . . ] all calculated dependencies will be persisted in the map for reuse.
1. Find all contributor nodes which are not depend on others, contributors[ ].
2. Find all 1st level dependencies depend on contributors[ ] as: 1st[ ],
3. Dead loop detection.
4. Get metrics in 1st[ ] whose dependency metrics have been in allcontributors[ ] as new contributors[ ].
5. Redo step 2, 3 and 4 recursion to find higher level metrics until no more leaf/contributors are found.

Figure 5:
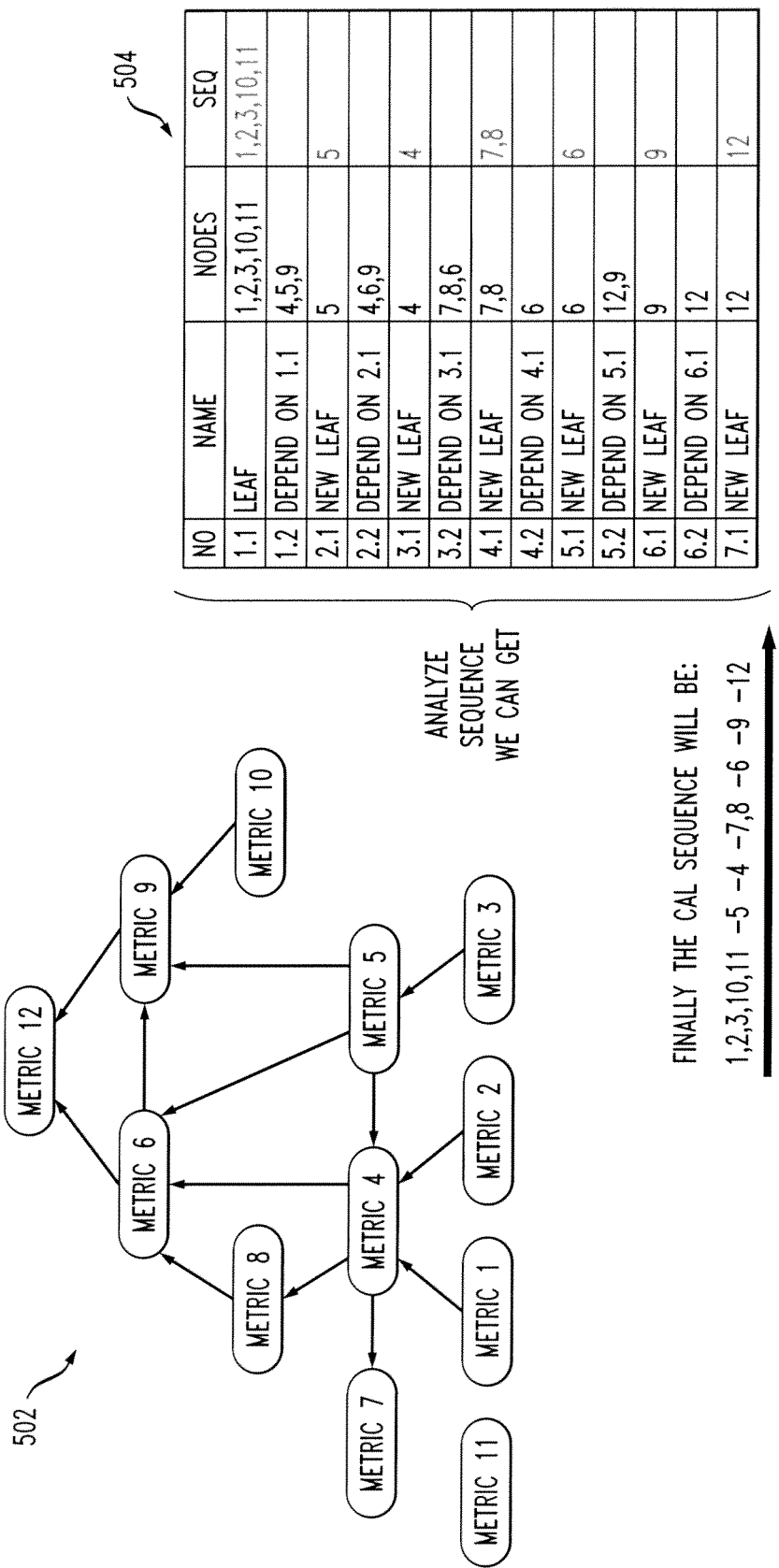
FIG. 5 is a diagram illustrating a metric graph forming example, according to an embodiment of the present invention.

FIG. 5 is a diagram illustrating a metric graph forming example, according to an embodiment of the present invention. By way of illustration, FIG. 5 depicts inter-dependencies between metrics in a graph model 502 and an example of calculation input/output by forming algorisms 504. Additionally, the "contributor node" described above is the same meaning of "Leaf" (in 504).

By way of illustration of one or more embodiments of the invention, consider the following example. Sally runs an enterprise, selling cups to passing customers. Amy prepares the cups. When Sally runs out of cups and change, she has to call Amy to ask her for more. She decides to use monitoring to help improve the enterprise operations.

Enterprise goals can include, for example, a target profit per day of $10 (for instance, a target volume of 40 cups/day, with each cup costing the customer $0.5 and cost per cup to the enterprise being $0.25). Additionally, another goal can include a target return on investment (ROI) of 10% where investment is $200.

Metrics for the enterprise can include, by of example, the following:
- Volume per day (total cups sold in a day);
- Sales per day (volume per day*per cup);
- Cost per day (volume per day*cost per cup);
- Sales per week (summation of sales per day for each day of the week);
- Sales per month (summation of sales per week for each week of the month);
- Total profit (summation of profit per month for each month the enterprise is in operation);
- Customer wait time; and
- Average customer wait time.

Key performance indicators (KPIs) for Sally's enterprise can include, for example, the following:
- Profit per day (sales per day−cost per day) (-or- volume per day*($0.5−$0.25));
- Profit per week (summation of profit per day for each day of the week);
- Profit per month (summation of profit per week for each week of the month);
- ROI (Total profit/investment); and
- Turnaround time (duration between the time when a customer shows up and the time he/she is served).

Alerts can include, by way of example, the following:
- Alert on profit per day <$10;
- Weekly alert if profit per week is <$70;
- Monthly alert if profit per month is <$280;
- Alert on wait time >4 minutes; and
- Alert on ROI <10%.

Figure 6:
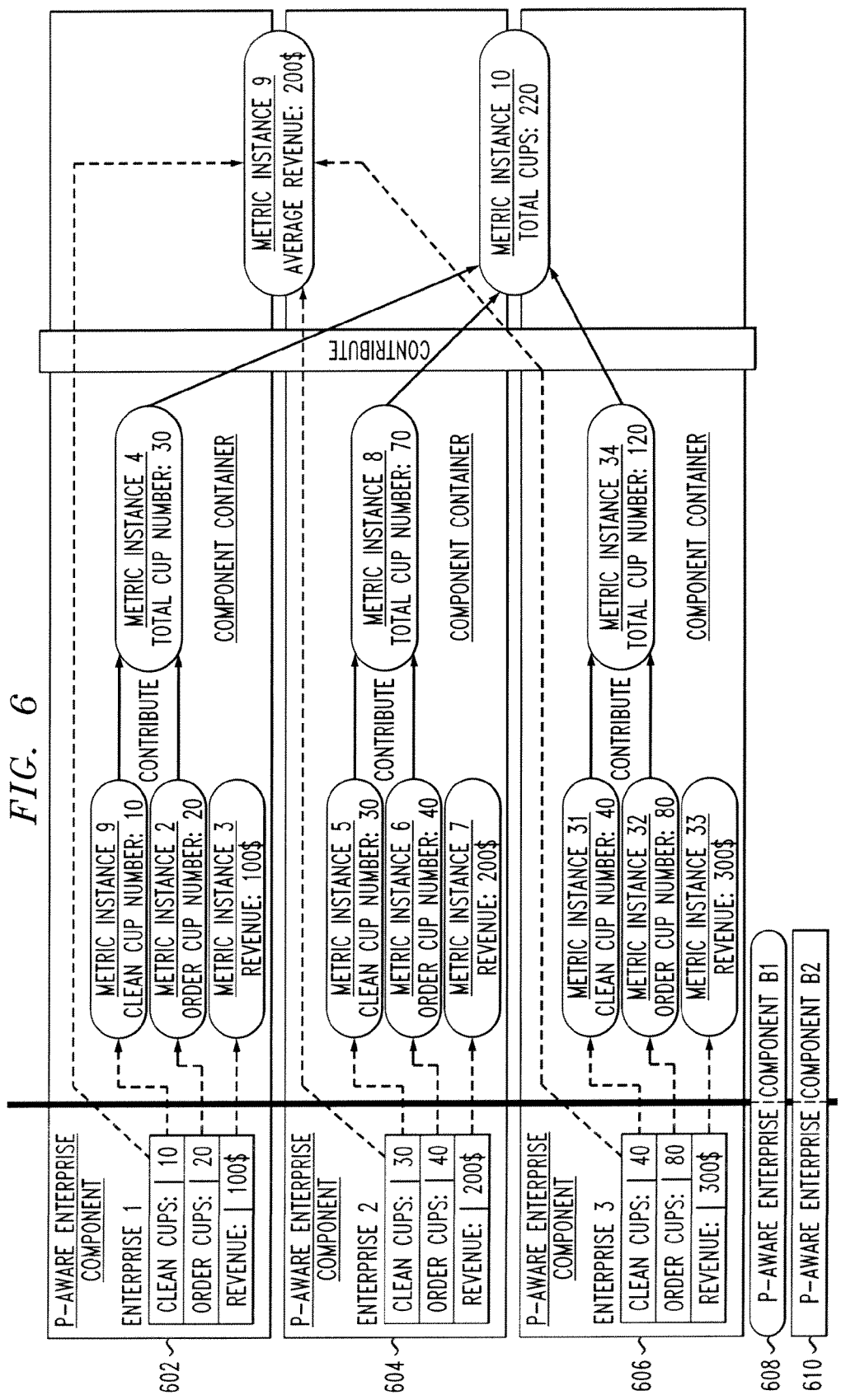
FIG. 6 is a diagram illustrating an enterprise metric lifecycle scenario example, according to an embodiment of the present invention.

FIG. 6 is a diagram illustrating an enterprise metric lifecycle scenario example, according to an embodiment of the present invention. By way of illustration, FIG. 6 depicts performance-aware enterprise component (PAEC) 602 for Enterprise 1, PAEC 604 for Enterprise 2, PAEC 606 for Enterprise 3, PAEC B1 608 and PAEC B2 610. FIG. 6 illustrates existing PAEC components in the container. The expanded layer (602, 604, and 606) depicts detail enterprise component instances and related metric lifecycle. "PAEC B1" and "PAEC B2" depict that there are other PAEC components in the container but not showing the detail metric lifecycle.

FIG. 7 is a diagram illustrating an exemplary performance metric template, according to an embodiment of the present invention. By way of illustration, FIG. 7 depicts an information model 702, a metric lifecycle 704, value slots 706, and service plans 708 and 710. Metric templates serve mostly at build time, after deployment to runtime container. The information model 702 will serve storing metric data during the runtime including: name, related component, dependencies, values and expressions, some metrics value are calculated by multiple references. For example: M1=(M2+M3)/M4, for calculation convenience; value slots are left to store calculation inputs (M2+M3)/M4.

Using the example from above, enterprise metrics using the metric template could include, by way of example, the following:
A metric for clean cups:
Name: CleanCups
ComponentName: Enterprise
ActionExpressions: {<=5: 'Call Amy'}
{<=0: CustomerOrder_CustomerWaitingNumber,
<=0: CustomerOrder_CustomerWaitingTime}
DependentMetrics:
ValueExpression: {Enterprise.CleanCups}
A metric for the cash-box being out of change status:
Name: OutOfChangeStatus
ComponentName: CashBox
ActionExpressions: {=1: notify amy}
{=1: CustomerOrder_CustomerWaitingNumber,
=1: CustomerOrder_CustomerWaitingTime}?
DependentMetrics:
ValueExpression: (CashBox.status=='OutOfChange')
Add condition, (begin time, end time) for dependent metrics
A metric for customer order, and customer waiting number per outage:
Name: CustomerWaitingNumberPerOutage
ComponentName: CustomerOrder
ActionExpressions: {>0: recording}
DependentMetrics: {CustomerOrder_AverageCustomerWaitLength, CustomerOrder MaxCustomerWaitLength}
ValueExpression: Sum(CustomerOrder.status='Waiting')
Triggered by 1st Waiting, ended by non-outage?
Add condition, (begin time, end time) for value expression.
Also:
Name: CustomerWaitingTimePerOutage
ComponentName: CustomerOrder
ActionExpressions: {>0: recording}
DependentMetrics:
ValueExpression: (CustomerOrder.ServedTime−CustomerOrder.ArrivalTime) Triggered by 1st Waiting, ended by non-outage?
A metric for daily number of cups sold (volume per day):
Name: DailyNumberOfCupSold
ComponentName: Enterprise?
ActionExpressions: { }
DependentMetrics:
ValueExpression: Enterprise.CupsOrdered per day.
A metric for daily income (profit per day):
Name: DailyIncome
ComponentName: Enterprise? Or CashBox
ActionExpressions: { }
DependentMetrics: CashBox_AccumulatedNetIncome
ValueExpression: CashBox.CurrentTotal−CashBox.OpenTotal per day?
A metric for accumulated income (profit in a week or a month):
Name: AccumulatedIncome
ComponentName: Enterprise?
ActionExpressions: {<($200*number of weeks in operation): alert}
DependentMetrics:
ValueExpression: Sum {DailyIncome}
Add time information to metric information model for calculation.

As described herein, one or more embodiments of the invention include using a SDS Model, which can serve to separate the planning, scheduling and execution functions of a controller. Planning can be external to simulation, and execution can include a task generator for a lower level controller and/or be based on a formal model.

With formal models, characteristics may be needed. In a succinct model, one can query whether the representation of any system in the model is relatively small. In an expressive model, one can query whether a variety of systems can be represented by the model. Formal models can be computationally "easy," enable hierarchy, and include a focus of succinctness of formal models for execution components of data encryption standard-(DES-)based control.

Figure 8:
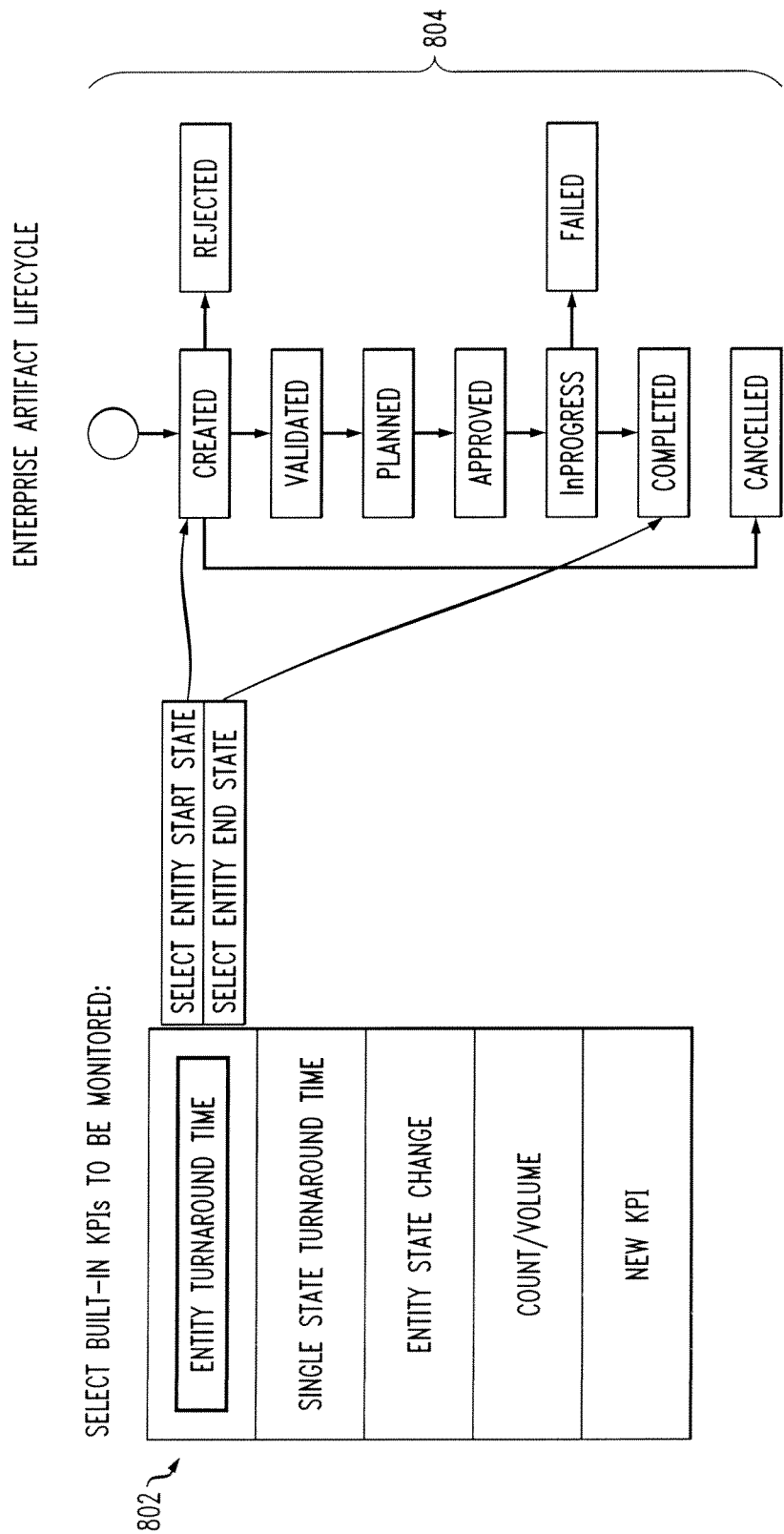
FIG. 8 is a diagram illustrating entity turnaround time key performance indicator (KPI) monitoring, according to an embodiment of the present invention.

FIG. 8 is a diagram illustrating entity turnaround time KPI monitoring, according to an embodiment of the present invention. By way of illustration, FIG. 8 depicts select built-in KPIs to be monitored 802 and an enterprise artifact lifecycle 804. As illustrated in FIG. 8, because metrics are natively within a component context, an EntityStartEvent can be sent automatically for the selected start state of the enterprise component, such as, for example, "Create," and the EntityEndEvent sent selected end state "Completed."

Figure 9:
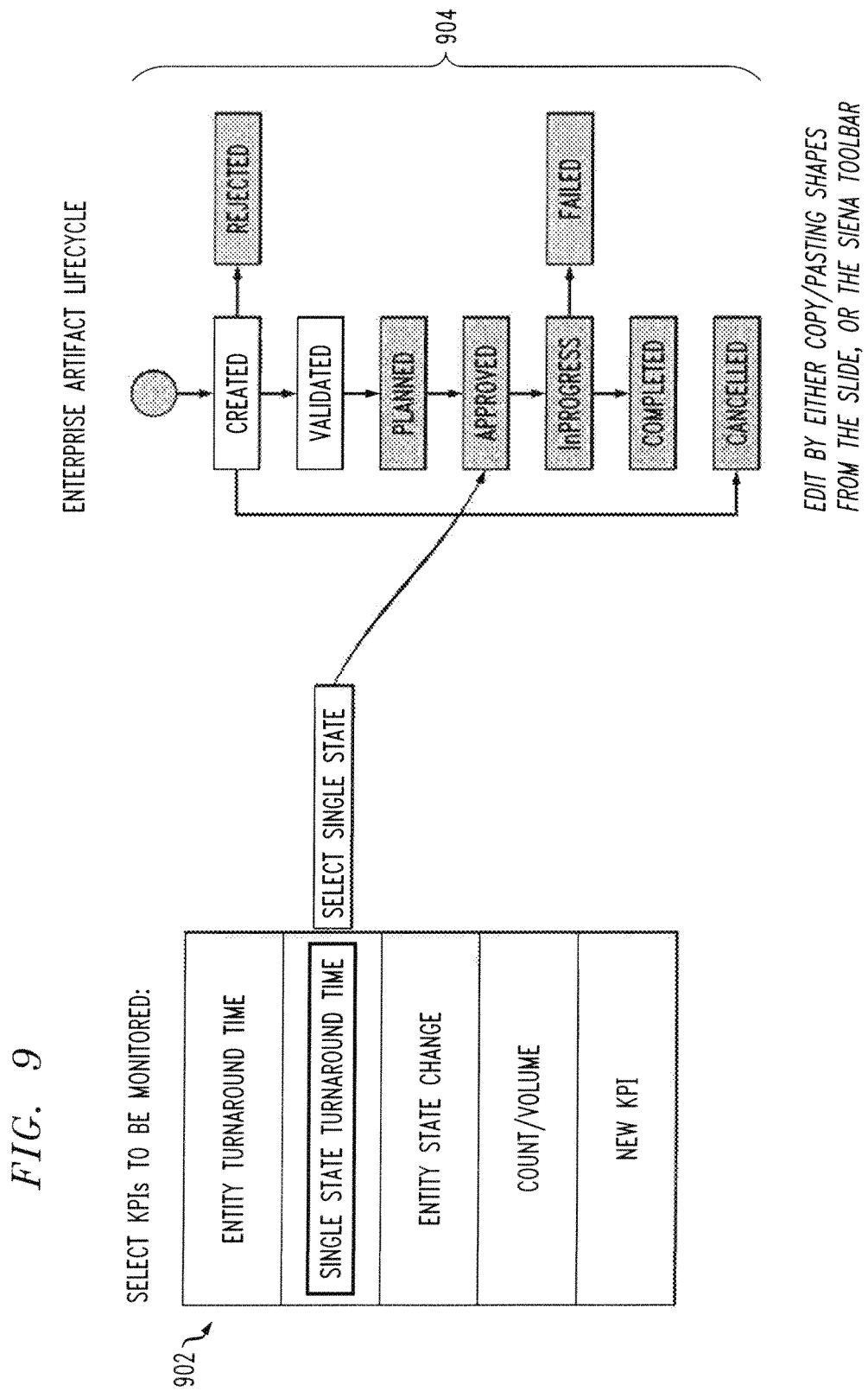
FIG. 9 is a diagram illustrating single-entity turnaround time KPI monitoring, according to an embodiment of the present invention.

FIG. 9 is a diagram illustrating single-entity turnaround time KPI monitoring, according to an embodiment of the present invention. By way of illustration, FIG. 9 depicts select KPIs to be monitored 902 and an enterprise artifact lifecycle 904. As illustrated in FIG. 9, because metrics are natively within a component context, an EntityStateStartEvent and EntityStateEndEvent can be sent automatically for the selected state(s) of the enterprise component (for example, "Approved").

Figure 10:
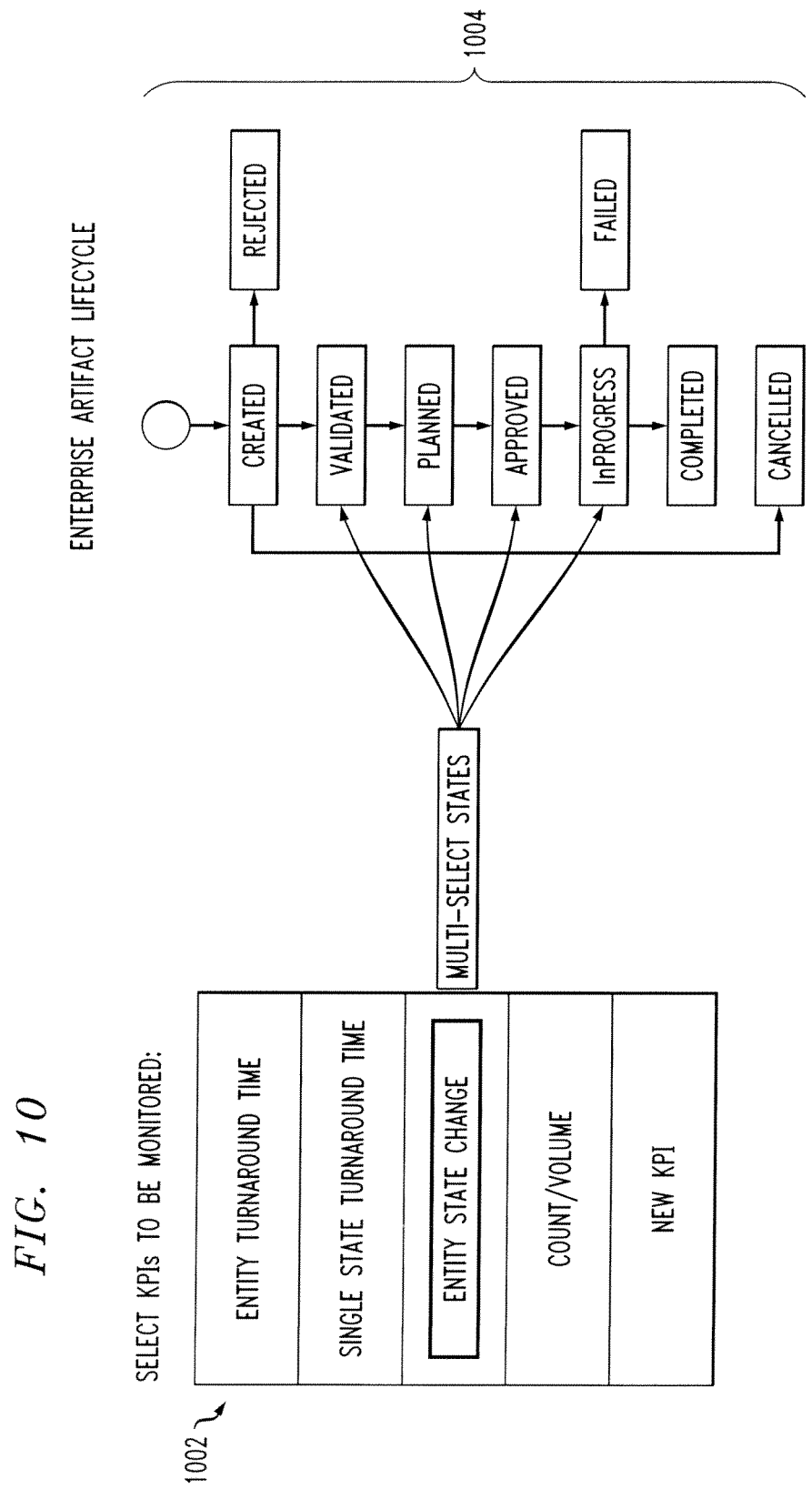
FIG. 10 is a diagram illustrating entity state changes KPI monitoring, according to an embodiment of the present invention.

FIG. 10 is a diagram illustrating entity state changes KPI monitoring, according to an embodiment of the present invention. By way of illustration, FIG. 10 depicts select KPIs to be monitored 1002 and an enterprise artifact lifecycle 1004. As illustrated in FIG. 10, because metrics are natively within a component context, EntityStateChangeEvent can be automatically sent for these states of the enterprise component.

Figure 11:
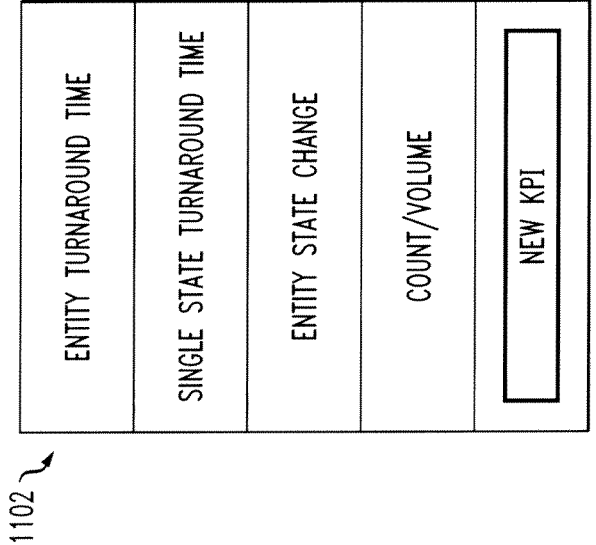
FIG. 11 is a diagram illustrating new KPI creation KPI monitoring, according to an embodiment of the present invention.

FIG. 11 is a diagram illustrating new KPI creation KPI monitoring, according to an embodiment of the present invention. By way of illustration, FIG. 11 depicts select KPIs to be monitored 1102 and name items 1104 and 1106. Both 1104 and 1106 are sample KPI, which are similar to "Instance Level" metrics which are related to monitoring data values of enterprise components.

Figure 12:
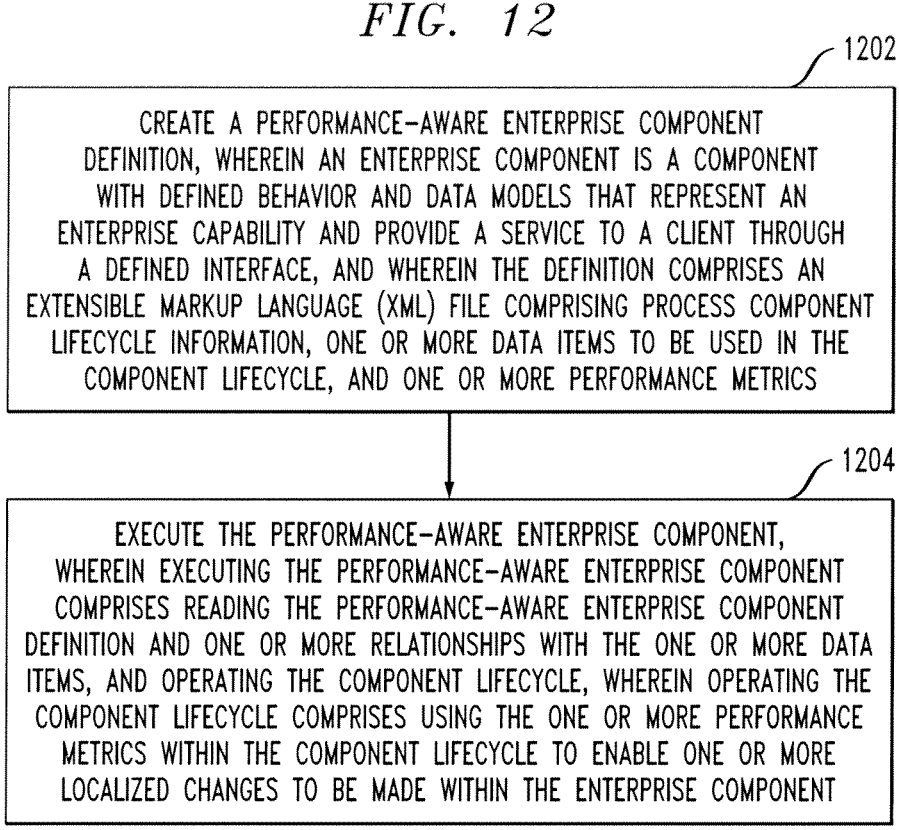
FIG. 12 is a flow diagram illustrating techniques for generating and executing one or more performance-aware enterprise components (PAECs), according to an embodiment of the invention.

FIG. 12 is a flow diagram illustrating techniques for generating and executing one or more performance-aware enterprise components (PAECs), according to an embodiment of the present invention. Step 1202 includes creating a performance-aware enterprise component definition, wherein an enterprise component is a component with defined behavior and data models that represent an enterprise capability and provide a service to a client through a defined interface, and wherein the definition comprises an extensible markup language (XML) file comprising process component lifecycle information, one or more data items to be used in the component lifecycle, and one or more performance metrics. A "process" is a component lifecycle which refers to, for example, "FlowModel" and "LifecyleModel" (as depicted by item 310 in FIG. 3), and a "service" refers, for example, to "ProvidedService" (as depicted by item 340 in FIG. 3).

Step 1204 includes executing the performance-aware enterprise component, wherein executing the performance-aware enterprise component comprises reading the performance-aware enterprise component definition and one or more relationships with the one or more data items, and operating the component lifecycle, wherein operating the component lifecycle comprises using the one or more performance metrics within the component lifecycle to enable one or more localized changes to be made within the enterprise component.

The performance metrics relate to process execution states and data fields, include a lifecycle description for calculation as well as include a service plan for dependencies notification, situation evaluation and action taking. One or more embodiments of the invention, for example, can also include enabling performance metric value retrieving and firing calculation. Also, creating a PAEC definition can include, for example, performing process modeling, information modeling, and metric modeling.

Executing the PAEC can further include capturing one or more system changes in a runtime system used for executing the performance-aware enterprise component. Also, the runtime system can form sequential dynamical system (SDS) metrics graphs according to inter-metrics dependencies.

Additionally, the techniques depicted in FIG. 12 are scalable and evolvable, wherein new requirements can be accommodated via one or more local changes. Further, one or more embodiments of the invention include automatically initiating, executing, calculating and archiving one or more component-related performance metrics natively within a component context.

The techniques depicted in FIG. 12 can also, as described herein, include providing a system, wherein the system includes distinct software modules, each of the distinct software modules being embodied on a tangible computer-readable recordable storage medium. The distinct software modules can include, for example, a tooling module, a meta model module and a runtime system module executing on a hardware processor.

Additionally, the techniques depicted in FIG. 12 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 13:
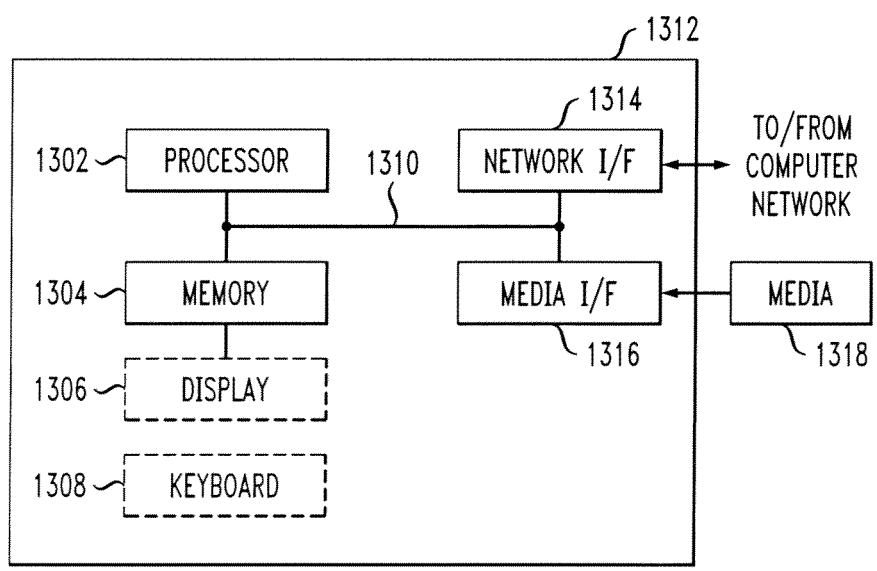
FIG. 13 is a system diagram of an exemplary computer system on which at least one embodiment of the invention can be implemented.

One or more embodiments can make use of software running on a general purpose computer or workstation. With reference to FIG. 13, such an implementation might employ, for example, a processor 1302, a memory 1304, and an input/output interface formed, for example, by a display 1306 and a keyboard 1308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1302, memory 1304, and input/output interface such as display 1306 and keyboard 1308 can be interconnected, for example, via bus 1310 as part of a data processing unit 1312. Suitable interconnections, for example via bus 1310, can also be provided to a network interface 1314, such as a network card, which can be provided to interface with a computer network, and to a media interface 1316, such as a diskette or CD-ROM drive, which can be provided to interface with media 1318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1302 coupled directly or indirectly to memory elements 1304 through a system bus 1310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1308, displays 1306, pointing devices, and the like) can be coupled to the system either directly (such as via bus 1310) or through intervening I/O controllers (omitted for clarity).

Network adapters such as network interface 1314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1312 as shown in FIG. 13) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 1318 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction implementation system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction implementation system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in the figures and corresponding text herein. The method steps can then be carried out using the distinct software modules and/or sub-modules of the system, as described above, executing on one or more hardware processors 1302. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, providing improved scalability (for example, EPM components can be automatically scaled up as the associated enterprise component grows), improved agility (for example, EPM components can automatically adapt to new enterprise component), and improved dynamic composability (for example, EPM architectures can automatically handle new EPM components for new enterprise components). Thus, in many situations, a complete rewrite of an EPM component, which could eventually raise the risk of failure, is not needed.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for generating and executing a performance-aware enterprise component (PAEC), wherein the method comprises:

creating a performance-aware enterprise component definition,
   wherein the performance-aware enterprise component is a component of an enterprise process comprising multiple components,
   wherein the performance-aware enterprise component has defined behavior and data models that represent an enterprise capability and provide a service to a client through a defined interface,
   wherein the definition comprises an extensible markup language (XML) file comprising (i) information pertaining to a process component lifecycle, (ii) each of one or more data items to be used in the process component lifecycle, and (iii) one or more performance metrics, and
   wherein creating a performance-aware enterprise component definition is carried out by a module executing on the processor; and executing the performance-aware enterprise component, wherein executing the performance-aware enterprise component comprises:
   (a) reading the performance-aware enterprise component definition and one or more relationships with the one or more data items, and operating the process component lifecycle,
      wherein operating the process component lifecycle comprises using the one or more performance metrics within the process component lifecycle to enable one or more localized changes to be made within the performance-aware enterprise component while maintaining the performance-aware enterprise component's participation in an implementation of the enterprise process, and
   (b) capturing one or more system changes in a runtime system used for executing the performance-aware enterprise component by forming one or more sequential dynamical system (SDS) metrics graphs according to one or more inter-metrics dependencies, wherein each of the one or more sequential dynamical system (SDS) metrics graphs comprise:
(i) an underlying graph G=(V,E), wherein each node in V denotes a performance metric, and wherein each edge in E denotes a dependency between two performance metrics,
(ii) an update function associated with each node of the sequential dynamical system (SDS) metrics graph, wherein each update function determines how the node associated therewith depends on one or more neighboring nodes in the sequential dynamical system (SDS) metrics graph (G), and wherein inputs to each update function comprise (a) a current value of the node associated therewith and (b) current values of the one or more neighboring nodes in G, and
(iii) an update order, wherein the update order denotes an order in which the nodes in V are updated at a given time step, and
wherein executing the performance-aware enterprise component is carried out by a module executing on the processor.

2. The method of claim 1, further comprising automatically initiating, executing, calculating and archiving the one or more performance metrics natively within a component context.

3. The method of claim 1, wherein the one or more performance metrics relate to one or more process execution states and one or more data fields.

4. The method of claim 1, wherein each of the one or more performance metrics includes a lifecycle description for calculation.

5. The method of claim 1, wherein each of the one or more performance metrics includes a service plan for dependencies notification, situation evaluation and action taking.

6. The method of claim 1, further comprising enabling performance of metric value retrieving and a firing calculation.

7. The method of claim 1, wherein creating a performance-aware enterprise component definition comprises performing process modeling, information modeling, and metric modeling.

8. The method of claim 1, further comprising providing a system, wherein the system comprises one or more distinct software modules, each of the one or more distinct software modules being embodied on a tangible computer-readable recordable storage medium, and wherein the one or more distinct software modules comprise a tooling module, a meta model module and a runtime system module executing on a hardware processor.

9. A computer program product comprising a tangible computer readable recordable storage medium including computer useable program code for generating and executing one or more performance-aware enterprise components (PAECs), the computer program product including:
computer useable program code for creating a performance-aware enterprise component definition,
wherein the performance-aware enterprise component is a component of an enterprise process comprising multiple components,
wherein the performance-aware enterprise component has defined behavior and data models that represent an enterprise capability and provide a service to a client through a defined interface, and
wherein the definition comprises an extensible markup language (XML) file comprising (i) information pertaining to a process component lifecycle, (ii) each of one or more data items to be used in the process component lifecycle, and (iii) one or more performance metrics; and
computer useable program code for executing the performance-aware enterprise component, wherein executing the performance-aware enterprise component comprises:
(a) reading the performance-aware enterprise component definition and one or more relationships with the one or more data items, and operating the process component lifecycle,
wherein operating the process component lifecycle comprises using the one or more performance metrics within the process component lifecycle to enable one or more localized changes to be made within the performance-aware enterprise component while maintaining the performance-aware enterprise component's participation in an implementation of the enterprise process, and
(b) capturing one or more system changes in a runtime system used for executing the performance-aware enterprise component, wherein the runtime system forms one or more sequential dynamical system (SDS) metrics graphs according to one or more inter-metrics dependencies,
wherein each of the one or more sequential dynamical system (SDS) metrics graphs comprise:
(i) an underlying graph G=(V,E), wherein each node in V denotes a performance metric, and wherein each edge in E denotes a dependency between two performance metrics,
(ii) an update function associated with each node of the sequential dynamical system (SDS) metrics graph, wherein each update function determines how the node associated therewith depends on one or more neighboring nodes in the sequential dynamical system (SDS) metrics graph (G), and wherein inputs to each update function comprise (a) a current value of the node associated therewith and (b) current values of the one or more neighboring nodes in G, and
(iii) an update order, wherein the update order denotes an order in which the nodes in V are updated at a given time step.

10. The computer program product of claim 9, further comprising computer useable program code for automatically initiating, executing, calculating and archiving the one or more performance metrics natively within a component context.

11. The computer program product of claim 9, wherein the one or more performance metrics relate to one or more process execution states and one or more data fields.

12. The computer program product of claim 9, further comprising computer useable program code for enabling performance of perform metric value retrieving and a firing calculation.

13. The computer program product of claim 9, wherein the computer useable program code for creating a performance-aware enterprise component definition comprises computer useable program code for performing process modeling, information modeling, and metric modeling.

14. The computer program product of claim 9, wherein the computer useable program code comprises one or more distinct software modules, and wherein the one or more distinct software modules comprise a tooling module, a meta model module and a runtime system module executing on a hardware processor.

15. An apparatus generating and executing one or more performance-aware enterprise components (PAECs), the apparatus comprising:
a memory; and
at least one processor coupled to the memory and operative for:
creating a performance-aware enterprise component definition,
wherein the performance-aware enterprise component is a component of an enterprise process comprising multiple components,
wherein the performance-aware enterprise component has defined behavior and data models that represent an enterprise capability and provide a service to a client through a defined interface,
wherein the definition comprises an extensible markup language (XML) file comprising (i) information pertaining to a process component lifecycle, (ii) each of one or more data items to be used in the process component lifecycle, and (iii) one or more performance metrics, and
wherein said creating comprises a module executing on the at least one processor; and
executing the performance-aware enterprise component, wherein executing the performance-aware enterprise component comprises:
(a) reading the performance-aware enterprise component definition and one or more relationships with the one or more data items, and operating the process component lifecycle,
wherein operating the process component lifecycle comprises using the one or more performance metrics within the process component lifecycle to enable one or more localized changes to be made within the performance-aware enterprise component while maintaining the performance-aware enterprise component's participation in an implementation of the enterprise process, and
(b) capturing one or more system changes in a runtime system used for executing the performance-aware enterprise component, wherein the runtime system forms one or more sequential dynamical system (SDS) metrics graphs according to one or more inter-metrics dependencies,
wherein each of the one or more sequential dynamical system (SDS) metrics graphs comprise:
(i) an underlying graph $G=(V,E)$, wherein each node in V denotes a performance metric, and wherein each edge in E denotes a dependency between two performance metrics,
(ii) an update function associated with each node of the sequential dynamical system (SDS) metrics graph, wherein each update function determines how the node associated therewith depends on one or more neighboring nodes in the sequential dynamical system (SDS) metrics graph (G), and wherein inputs to each update function comprise (a) a current value of the node associated therewith and (b) current values of the one or more neighboring nodes in G, and
(iii) an update order, wherein the update order denotes an order in which the nodes in V are updated at a given time step, and
wherein said executing comprises a module executing on the at least one processor.

16. The apparatus of claim 15, wherein said creating a performance-aware enterprise component definition comprises performing process modeling, information modeling, and metric modeling.

* * * * *